United States Patent
Nagaoka et al.

(10) Patent No.: US 12,192,862 B2
(45) Date of Patent: Jan. 7, 2025

(54) CONTROL SYSTEM, RADIO TELEPHONE DEVICE, CONTROL METHOD AND PROGRAM

(71) Applicant: Nippon Telegraph and Telephone Corporation, Tokyo (JP)

(72) Inventors: Ryo Nagaoka, Musashino (JP); Masahiko Noguchi, Musashino (JP); Shuji Kimura, Musashino (JP); Nobuhiro Kimura, Musashino (JP); Taichi Osada, Musashino (JP); Takashi Yasunaga, Musashino (JP); Takato Toda, Musashino (JP); Ruriko Matsuura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 351 days.

(21) Appl. No.: 17/782,012

(22) PCT Filed: Dec. 5, 2019

(86) PCT No.: PCT/JP2019/047619
§ 371 (c)(1),
(2) Date: Jun. 2, 2022

(87) PCT Pub. No.: WO2021/111580
PCT Pub. Date: Jun. 10, 2021

(65) Prior Publication Data
US 2023/0008133 A1    Jan. 12, 2023

(51) Int. Cl.
*H04W 4/16*    (2009.01)
*H04B 17/318*    (2015.01)
(Continued)

(52) U.S. Cl.
CPC ............ *H04W 4/16* (2013.01); *H04B 17/318* (2015.01); *H04M 11/066* (2013.01); *H04W 24/10* (2013.01)

(58) Field of Classification Search
None
See application file for complete search history.

(56) References Cited

U.S. PATENT DOCUMENTS

2016/0330771 A1* 11/2016 Tan .................... H04B 7/18506

FOREIGN PATENT DOCUMENTS

| EP | 3422598 A1 * | 1/2019 | ........... B64C 39/024 |
| JP | 2014103586 A * | 6/2014 | ........... H04M 11/04 |
| KR | 101892003 B1 * | 8/2018 | ........... H04W 48/18 |

OTHER PUBLICATIONS

Civil Aviation Bureau, Ministry of Land, Infrastructure, Transport and Tourism, "Guidelines for safe flight of unmanned aerial vehicles (drone, radio-controlled aircraft, etc.)," Ministry of Land, Infrastructure, Transport and Tourism, Apr. 26, 2019, retrieved from URL <https://www.mlit.go.jp/common/001287979.pdf>, 27 pages (with English Translation).

(Continued)

*Primary Examiner* — Adolf Dsouza
(74) *Attorney, Agent, or Firm* — Fish & Richardson P.C.

(57) ABSTRACT

A control system including: a first wireless telephone terminal; a second wireless telephone terminal; and a wireless mobile object. The first wireless telephone terminal includes a call placement/reception unit that establishes a voice channel over a mobile communication network with the second wireless telephone terminal and the wireless mobile object by using a multi-point call function of controlling a voice call among a plurality of points. A control unit controls the wireless mobile object by transmitting a control signal to the wireless mobile object through the voice channel, and transmits, to the second wireless telephone terminal through (Continued)

the voice channel, a change signal for changing a user who maneuvers the wireless mobile object when strength of radio waves from the wireless mobile object decreases to less than a threshold value.

6 Claims, 10 Drawing Sheets

(51) Int. Cl.
*H04M 11/06* (2006.01)
*H04W 24/10* (2009.01)

(56) References Cited

OTHER PUBLICATIONS

Japan Drone Association, "Seminars and qualifications sponsored by the Japan Drone Association," Japan Drone Association, retrieved on Nov. 22, 2019, retrieved from URL <https://www.alldrones.org/>, 21 pages (with English Translation).

Ministry of Land, Infrastructure, Transport and Tourism, "Flight rules for unmanned aerial vehicles (drone, radio-controlled aircraft, etc.)," Ministry of Land, Infrastructure, Transport and Tourism, retrieved on Nov. 22, 2019, retrieved from URL <https://www.mlit.go.jp/koku/koku_tk10_000003.html>, 13 pages (with English Translation).

Ministry of Land, Infrastructure, Transport and Tourism, "We are recruiting trainees for "Safety management and basic operation of unmanned aerial vehicles(drones),"" Ministry of Land, Infrastructure, Transport and Tourism, Aug. 8, 2018, retrieved from URL <https://www.col.mlit.go.jp/kenshu/H30-083-031.pdf>, 3 pages (with English Translation).

* cited by examiner

Fig. 4

| CONTROL SIGNAL | | MANEUVER INFORMATION |
|---|---|---|
| TONE SIGNAL | VOICE SIGNAL | |
| *1# | CLIMB, UP, GO UP | CLIMB |
| *2# | DESCEND, DOWN, GO DOWN | DESCENT |
| *3# | MOVE FORWARD, FORWARD, ADVANCE | FORWARD MOVEMENT |
| *4# | MOVE BACKWARD, MOVE BACK, BACK, RETURN | BACKWARD MOVEMENT |
| *5# | MOVE RIGHT, TO THE RIGHT | RIGHT MOVEMENT |
| *6# | MOVE LEFT, TO THE LEFT | LEFT MOVEMENT |
| *7# | ROTATE RIGHT, ROTATE TO THE RIGHT | RIGHT ROTATION |
| *8# | ROTATE LEFT, ROTATE TO THE LEFT | LEFT ROTATION |
| *13# | TAKE OFF | CLIMB + FORWARD MOVEMENT |
| *135# | CLIMB TO THE RIGHT | CLIMB + FORWARD MOVEMENT + RIGHT MOVEMENT |
| *1357# | TURN TO THE RIGHT | CLIMB + FORWARD MOVEMENT + RIGHT MOVEMENT + RIGHT ROTATION |
| ... | ... | ... |
| *0# | STAY, HALT, STOP, EMERGENCY STOP, LAND | STAY |

"*" CONTROL START KEY
"#" CONTROL END KEY

CONTROL SYSTEM, RADIO TELEPHONE DEVICE, CONTROL METHOD AND PROGRAM

CROSS-REFERENCE TO RELATED APPLICATIONS

This application is a National Stage application under 35 U.S.C. § 371 of International Application No. PCT/JP2019/047619, having an International Filing Date of Dec. 5, 2019, the disclosure of which is considered part of the disclosure of this application, and is incorporated in its entirety into this application.

TECHNICAL FIELD

The present invention relates to a control system, a wireless telephone terminal, a control method, and a control program.

BACKGROUND ART

Non-Patent Literatures 1 to 4 disclose methods for flying unmanned aerial vehicles.

CITATION LIST

Non-Patent Literature

Non-Patent Literature 1: "Flight rules on unmanned aerial vehicles (drones, radio-controlled aircraft, and the like)", Ministry of Land, Infrastructure, Transport and Tourism.
Non-Patent Literature 2: "Guidelines for safe flight of unmanned aerial vehicles (drones, radio-controlled aircraft, and the like)", Ministry of Land, Infrastructure, Transport and Tourism.
Non-Patent Literature 3: "Safety control and basic maneuvers of unmanned aerial vehicles (drones)", Training course by the Ministry of Land, Infrastructure, Transport and Tourism.
Non-Patent Literature 4: Training and certification by Japan Drone Association.

SUMMARY OF THE INVENTION

Technical Problem

In a case of causing an unmanned aerial vehicle to move beyond a range of visibility of a user, seamless operation, such as causing the unmanned aerial vehicle to continue to move far without interrupting the moving action of the unmanned aerial vehicle, cannot be conducted because it is necessary to stop maneuvering, by using a maneuver terminal, the unmanned aerial vehicle once, to disconnect wireless communication between the maneuver terminal and the unmanned aerial vehicle, and then to reconnect another maneuver terminal located beyond the range of visibility of the user to the unmanned aerial vehicle.

The present invention has been made in view of the above-described circumstances, and an object of the present invention is to provide a technology that makes it possible to seamlessly operate a wireless mobile object.

Means for Solving the Problem

A control system according to an aspect of the present invention is a control system including: a first wireless telephone terminal; a second wireless telephone terminal; and a wireless mobile object, wherein the first wireless telephone terminal includes a call placement/reception unit that establishes a voice channel over a mobile communication network with the second wireless telephone terminal and the wireless mobile object by using a multi-point call function of controlling a voice call among a plurality of points, and a control unit that controls the wireless mobile object by transmitting a control signal to the wireless mobile object through the voice channel, and that transmits, to the second wireless telephone terminal through the voice channel, a change signal for changing a user who maneuvers the wireless mobile object when strength of radio waves from the wireless mobile object decreases to less than a threshold value, the second wireless telephone terminal includes a call placement/reception unit that establishes the voice channel over the mobile communication network with the first wireless telephone terminal and the wireless mobile object by using the multi-point call function, and a control unit that controls the wireless mobile object by transmitting a control signal to the wireless mobile object through the voice channel when the change signal is received from the first wireless telephone terminal, and the wireless mobile object includes a call placement/reception unit that establishes the voice channel over the mobile communication network with the first wireless telephone terminal and the second wireless telephone terminal by using the multi-point call function, and a control unit that controls an action of the wireless mobile object, based on the control signal received from the first wireless telephone terminal through the voice channel, or based on the control signal received from the second wireless telephone terminal through the voice channel.

A wireless telephone terminal according to an aspect of the present invention is a wireless telephone terminal including: a call placement/reception unit that establishes a voice channel over a mobile communication network with another wireless telephone terminal and a wireless mobile object by using a multi-point call function of controlling a voice call among a plurality of points; and a control unit that controls the wireless mobile object by transmitting a control signal to the wireless mobile object through the voice channel, and that transmits, to the other wireless telephone terminal through the voice channel, a change signal for changing a user who maneuvers the wireless mobile object when strength of radio waves from the wireless mobile object decreases to less than a threshold value.

A control method according to an aspect of the present invention is a control method for controlling a wireless mobile object, performed by a wireless telephone terminal, including: by the wireless telephone terminal, establishing a voice channel over a mobile communication network with another wireless telephone terminal and the wireless mobile object by using a multi-point call function of controlling a voice call among a plurality of points; and controlling the wireless mobile object by transmitting a control signal to the wireless mobile object through the voice channel, and transmitting, to the other wireless telephone terminal through the voice channel, a change signal for changing a user who maneuvers the wireless mobile object when strength of radio waves from the wireless mobile object decreases to less than a threshold value.

A control program according to an aspect of the present invention causes a computer to perform the control method.

Effects of the Invention

According to the present invention, a technology can be provided that makes it possible to seamlessly operate a wireless mobile object.

BRIEF DESCRIPTION OF DRAWINGS

FIG. 4 shows an example of data components of translation information.

DESCRIPTION OF EMBODIMENTS

Hereinafter, embodiments of the present invention will be described with reference to drawings. In description of the drawings, the same parts are denoted by the same reference signs, and the same description thereof will be omitted.

Outline of the Invention

In order to provide a technology that makes it possible to seamlessly operate a wireless mobile object, the present invention discloses a wireless mobile object maneuver scheme that combines control of a wireless mobile object through a voice channel over a mobile communication network with a multi-point call function of a multi-point call system that controls a voice call among a plurality of points. The multi-point call function is, for example, a three-party call function, or a telephone conferencing function of a telephone conferencing system.

The three-party call function is, for example, a conference call function included in a PBX or business phones. For example, a called party is called from a business phone, and another called party who is wanted to participate in a conference call is further called, whereby a state is brought about in which three parties participate in the conference call. The three-party call function is an existing function.

The telephone conferencing function of a telephone conferencing system is, for example, a system that provides a plurality of persons with a simultaneous call, by the persons, from respective places, placing a call to a dedicated number (access point) on a public network issued by a telephone conferencing service. The telephone conferencing function is also an existing function.

By utilizing the multi-point call function of a multi-point call system to maneuver a wireless mobile object, disconnection from and reconnection to the wireless mobile object are not required even when the wireless mobile object moves beyond a range of visibility, and accordingly, it is possible to seamlessly operate the wireless mobile object.

First Embodiment

In a first embodiment, the three-party call function is used as an example of the multi-point call function.

(Entire Configuration of Control System)

Figure 1:
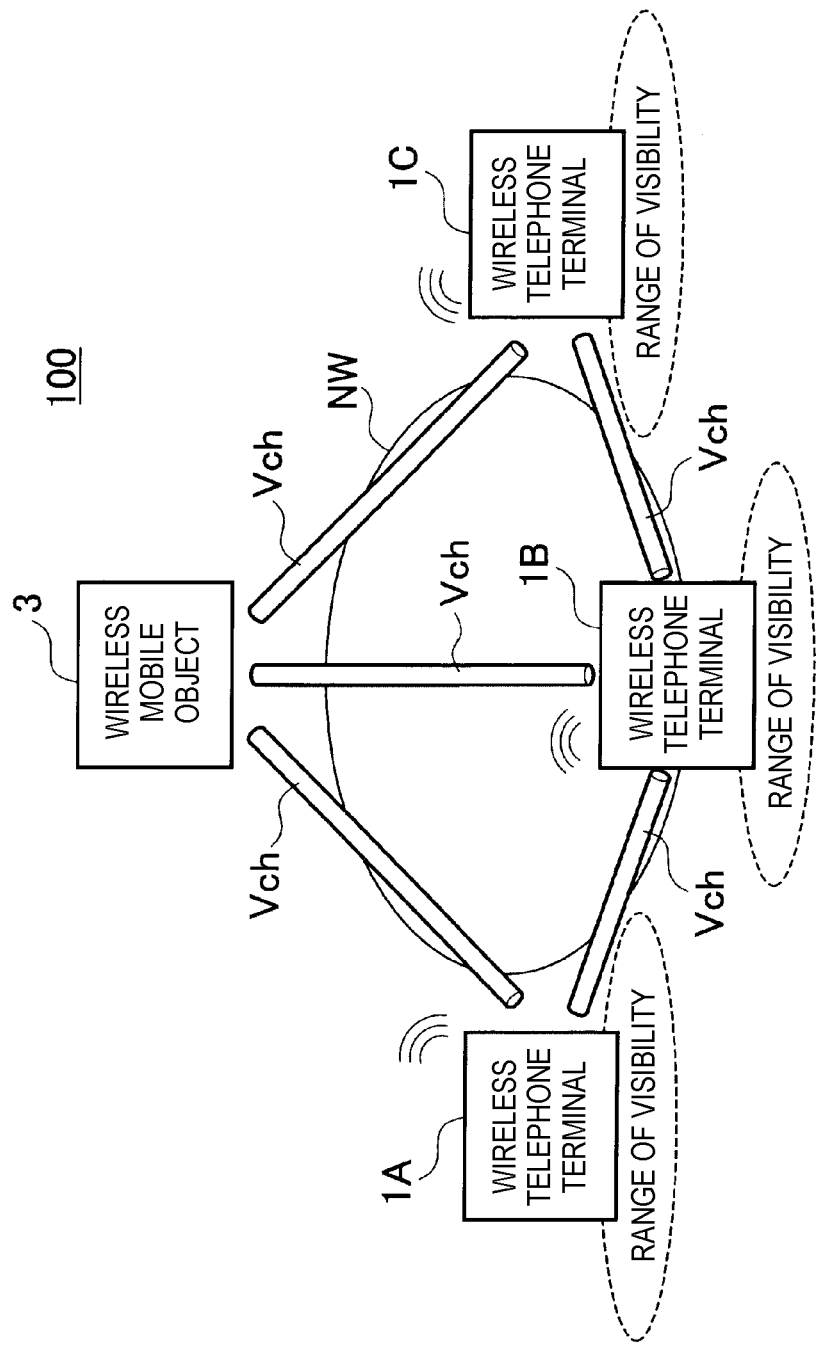
FIG. 1 is a configuration diagram showing an entirety of a control system in a first embodiment of the present invention.

FIG. 1 is a configuration diagram showing an entirety of a control system 100 in the first embodiment of the present invention. The control system 100 in the first embodiment includes three wireless telephone terminals 1 (1A to 1C) that can individually control a single wireless mobile object 3, and the single wireless mobile object 3 that is maneuvered by each of the three wireless telephone terminals 1 (1A to 1C).

Each wireless telephone terminal 1 (1A to 1C) is prepared for each range of user visibility, respectively. For example, when the range of user visibility is defined as 1 km, each of the three wireless telephone terminals 1 (1A to 1C) is deployed and prepared for every 1 km. Note that the range of user visibility, in general, varies from user to user and from time to time of operation, depending on a user state such as eyesight or an environmental condition such as weather. Accordingly, in the present invention, the range of user visibility is assumed to be a range in which mutual strength of radio waves between a wireless telephone terminal 1 and the wireless mobile object 3 is equal to or greater than a threshold value.

A wireless telephone terminal 1 (1A to 1C) places a telephone call to each of the wireless mobile object 3 and another wireless telephone terminal 1 via a nearest wireless base station (not shown) and a mobile communication network NW, by using the three-party call function. Since the call is placed by using the three-party call function, a state is brought about in which the three-party call is enabled through a voice channel Vch over the mobile communication network NW. Then, the wireless telephone terminal 1 (1A to 1C) controls an action of the wireless mobile object 3 by transmitting a control signal through the voice channel Vch. Thereafter, when the wireless mobile object 3 moves and the strength of radio waves from the wireless mobile object 3 decreases to less than the threshold value, the wireless telephone terminal 1 transmits a change signal for changing a user who maneuvers the wireless mobile object 3, to the other wireless telephone terminal 1 through the voice channel Vch. When the other wireless telephone terminal 1 receives the change signal, the other wireless telephone terminal 1, in place of the wireless telephone terminal 1, continues to control an action of the wireless mobile object 3 by transmitting a control signal through the voice channel Vch.

Note that a voice channel Vch is a circuit-switched channel. In addition to voice channels Vch, the mobile communication network NW includes data channels Dch that are packet-switched channels. In the present invention, a voice channel Vch is used. In a case of a data channel Dch, signal and data delays may occur when circuits are congested, and such delays may cause a delay to an action of the wireless mobile object 3. On the other hand, in a case of a voice channel Vch, since a circuit is dedicated over the mobile communication network NW, signal and data delays do not occur, and responsiveness of an action of the wireless mobile object 3 can be enhanced.

(Configuration of Wireless Telephone Terminal)

Figure 2:
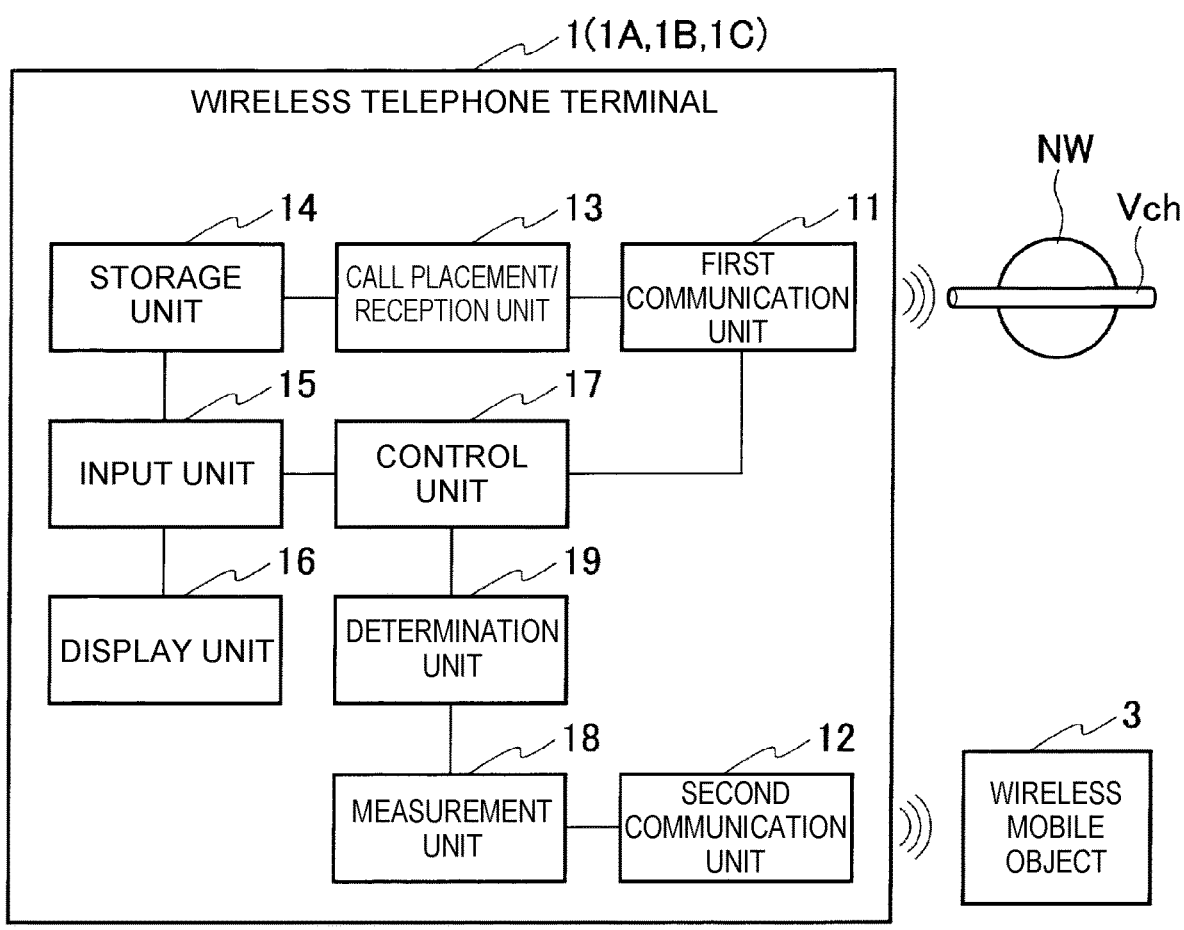
FIG. 2 is a block diagram showing a configuration of a wireless telephone terminal.

FIG. 2 is a block diagram showing a configuration of the wireless telephone terminal 1 (1A to 1C). The wireless telephone terminal 1 (1A to 1C) includes a first communication unit 11, a second communication unit 12, a call placement/reception unit 13, a storage unit 14, an input unit 15, a display unit 16, a control unit 17, a measurement unit 18, and a determination unit 19. The configuration of the wireless telephone terminal 1 shown in FIG. 2 is common among the three wireless telephone terminals 1A to 1C.

The first communication unit 11 includes, for example, an antenna, a communication circuit, or the like. The first communication unit 11 includes a function of transmitting a calling signal outputted from the call placement/reception unit 13 to the wireless mobile object 3 or another wireless telephone terminal 1 through a voice channel Vch over the mobile communication network NW. The first communication unit 11 includes a function of transmitting a control signal outputted from the control unit 17 to the wireless mobile object 3 through the voice channel Vch over the mobile communication network NW. The first communication unit 11 includes a function of transmitting a change signal outputted from the control unit 17 to the other wireless telephone terminal 1 through the voice channel Vch over the mobile communication network NW. The first communication unit 11 includes a function of receiving a calling signal or a change signal transmitted from another wireless telephone terminal 1.

The second communication unit 12 includes, for example, an antenna, a communication circuit, or the like. The second communication unit 12 includes a function of receiving radio waves outputted from the wireless mobile object 3.

The call placement/reception unit 13 includes a function of establishing a voice channel Vch over the mobile communication network NW with the wireless mobile object 3 and another wireless telephone terminal 1 by using the three-party call function. In other words, the call placement/reception unit 13 outputs a calling signal, through a voice channel Vch over the mobile communication network NW, to the wireless mobile object 3 or another wireless telephone terminal 1 with a telephone number inputted into the input unit 15. Thus, a state is brought about in which a three-party call is enabled through the voice channel Vch over the mobile communication network NW. "Outputting a calling signal" is synonymous with placing a call to or calling a called party. Moreover, the call placement/reception unit 13 receives a calling signal from another wireless telephone terminal 1 through a voice channel Vch over the mobile communication network NW.

The storage unit 14 includes a function of storing input data such as a telephone number inputted into the input unit 15.

The input unit 15 includes, for example, a physical button, a touch panel button, a microphone, or the like. The input unit 15 includes a function of receiving input data inputted by a user. The "input data" includes the telephone number of the wireless mobile object 3 or another wireless telephone terminal 1, and maneuver information (for example, a data sequence created by combining any of symbols, numbers, and characters, or voice) for maneuvering the wireless mobile object 3.

The display unit 16 includes a function of displaying the input data on a screen.

The control unit 17 includes a function of controlling the wireless mobile object 3 by generating a control signal including the maneuver information and transmitting the control signal to the wireless mobile object 3 through the voice channel Vch over the mobile communication network NW. The "control signal" is, for example, a tone signal including the above-mentioned data sequence, or a voice signal including the above-mentioned voice that is coded. The control unit 17 includes a function of, when the strength of radio waves from the wireless mobile object 3 decreases to less than the threshold value, transmitting a change signal for changing a user who maneuvers the wireless mobile object 3, to another wireless telephone terminal 1 through the voice channel Vch over the mobile communication network NW. The control unit 17 includes a function of, when a change signal is received from another wireless telephone terminal 1, controlling the wireless mobile object 3 by transmitting a control signal to the wireless mobile object 3 through the voice channel Vch over the mobile communication network NW.

The measurement unit 18 includes a function of measuring the strength of radio waves outputted from the wireless mobile object 3.

The determination unit 19 includes a function of determining whether or not the strength of radio waves outputted from the wireless mobile object 3 is less than the threshold value. The determination unit 19 includes a function of, when the strength of the radio waves decreases to less than the threshold value, notifying the control unit 17 that the strength of radio waves from the wireless mobile object 3 decreases to less than the threshold value.

The above-described wireless telephone terminal 1 can be implemented by using, for example, a mobile telephone, a smartphone terminal, or the like. Any terminal will do for the wireless telephone terminal 1 if the terminal is capable of communication based on circuit switching, and an existing wireless telephone terminal can be used as it is. Since the mobile communication network NW is connected also to a landline telephone network in general, an existing landline telephone terminal can also be used. In other words, for the wireless telephone terminal 1, a general-purpose telephone terminal, regardless of wireless or wired, can be used as it is as a controller.

(Configuration of Wireless Mobile Object)

Figure 3:
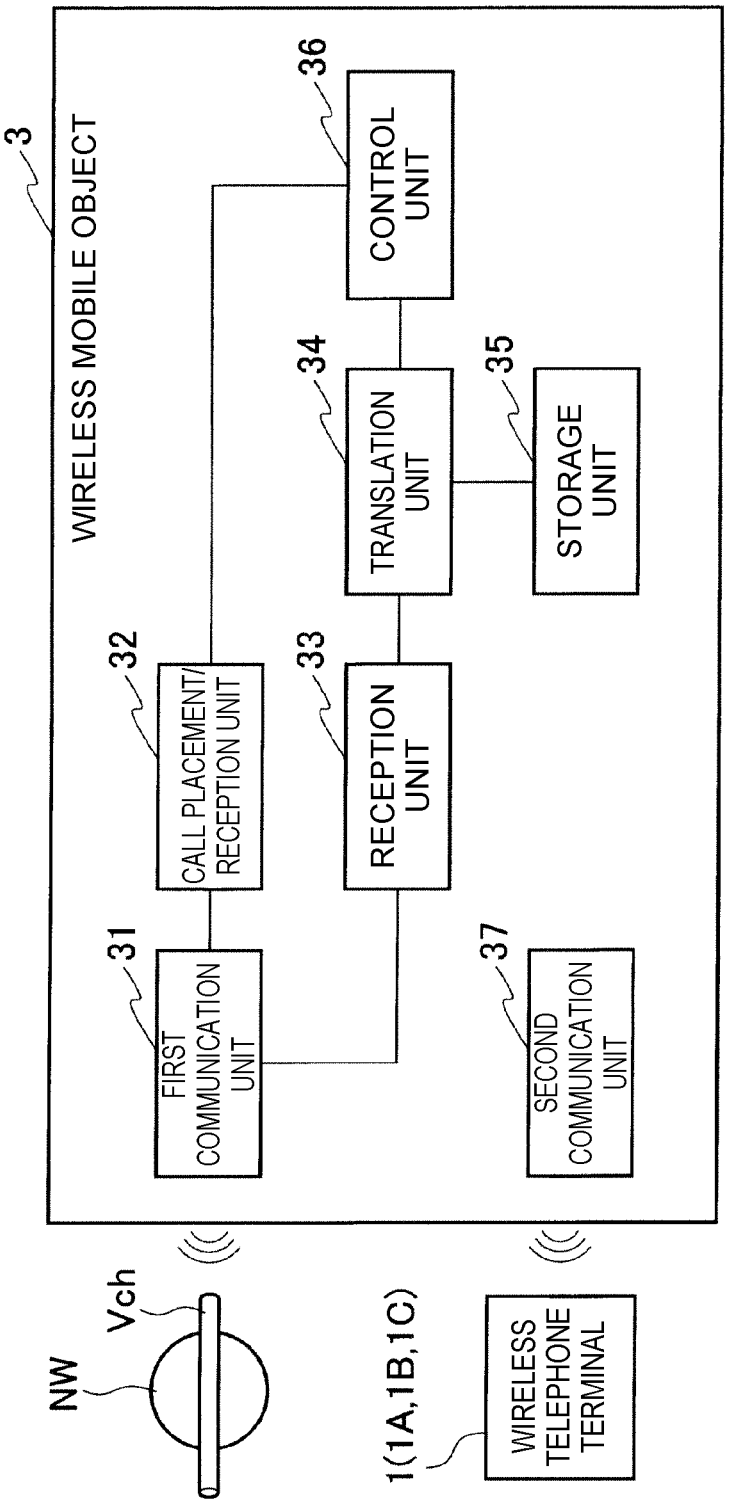
FIG. 3 is a block diagram showing a configuration of a wireless mobile object.

FIG. 3 is a block diagram showing a configuration of the wireless mobile object 3. The wireless mobile object 3 includes a first communication unit 31, a call placement/reception unit 32, a reception unit 33, a translation unit 34, a storage unit 35, a control unit 36, and a second communication unit 37.

The first communication unit 31 includes, for example, an antenna, a communication circuit, or the like. The first communication unit 31 includes a function of receiving a calling signal or a control signal outputted from a wireless telephone terminal 1 through a voice channel Vch over the mobile communication network NW.

The call placement/reception unit 32 includes a function of establishing a voice channel Vch over the mobile communication network NW with a plurality of wireless telephone terminals 1 (1A to 1C), by using the three-party call function. In other words, the call placement/reception unit 32 includes a function of receiving a calling signal from a wireless telephone terminal 1 through a voice channel Vch over the mobile communication network NW and responding to a call from the wireless telephone terminal 1. Thus, a state is brought about in which the three-party call is enabled through the voice channel Vch over the mobile communication network NW. The call placement/reception unit 32 is also capable of voluntarily outputting a calling signal to a wireless telephone terminal 1.

The reception unit 33 includes a function of receiving a control signal from the wireless telephone terminal 1 through the voice channel Vch over the mobile communication network NW.

The translation unit 34 includes a function of translating the control signal from the wireless telephone terminal 1 into maneuver information by using translation information read from the storage unit 35.

The storage unit 35 includes a function of storing the translation information in which a plurality of different control signals and maneuver information pieces corresponding to the plurality of control signals, respectively, are associated with each other. FIG. 4 shows an example of data components of the translation information. In the translation information, a content of each control signal (tone signal, voice signal) corresponding to each maneuver, respectively, is defined for each maneuver information piece (climb, descent, or the like) for maneuvering the wireless mobile object 3.

The control unit 36 includes a function of activating the wireless mobile object 3 in response to reception of the calling signal from the wireless telephone terminal 1. The control unit 36 includes a function of controlling an action of the wireless mobile object 3, according to the maneuver information obtained through translation by the translation unit 34 based on the control signal received from the wireless telephone terminal 1 through the voice channel Vch over the mobile communication network NW.

The second communication unit 37 includes, for example, an antenna, a communication circuit, or the like. The second communication unit 37 includes a function of outputting radio waves into a space. In other words, the second communication unit 37 outputs radio waves to the wireless telephone terminal 1 or the like.

The above-described wireless mobile object 3 can be implemented by using, for example, an unmanned aerial vehicle (drone) including a computer. Any vehicle will do for the wireless mobile object 3 if the vehicle is capable of communication based on circuit switching, and such vehicles include, for example, a glider, a hot-air balloon, an airship, an airplane, a helicopter, a car, a ship, a submarine, and the like.

Operation in Control System

Figure 5:
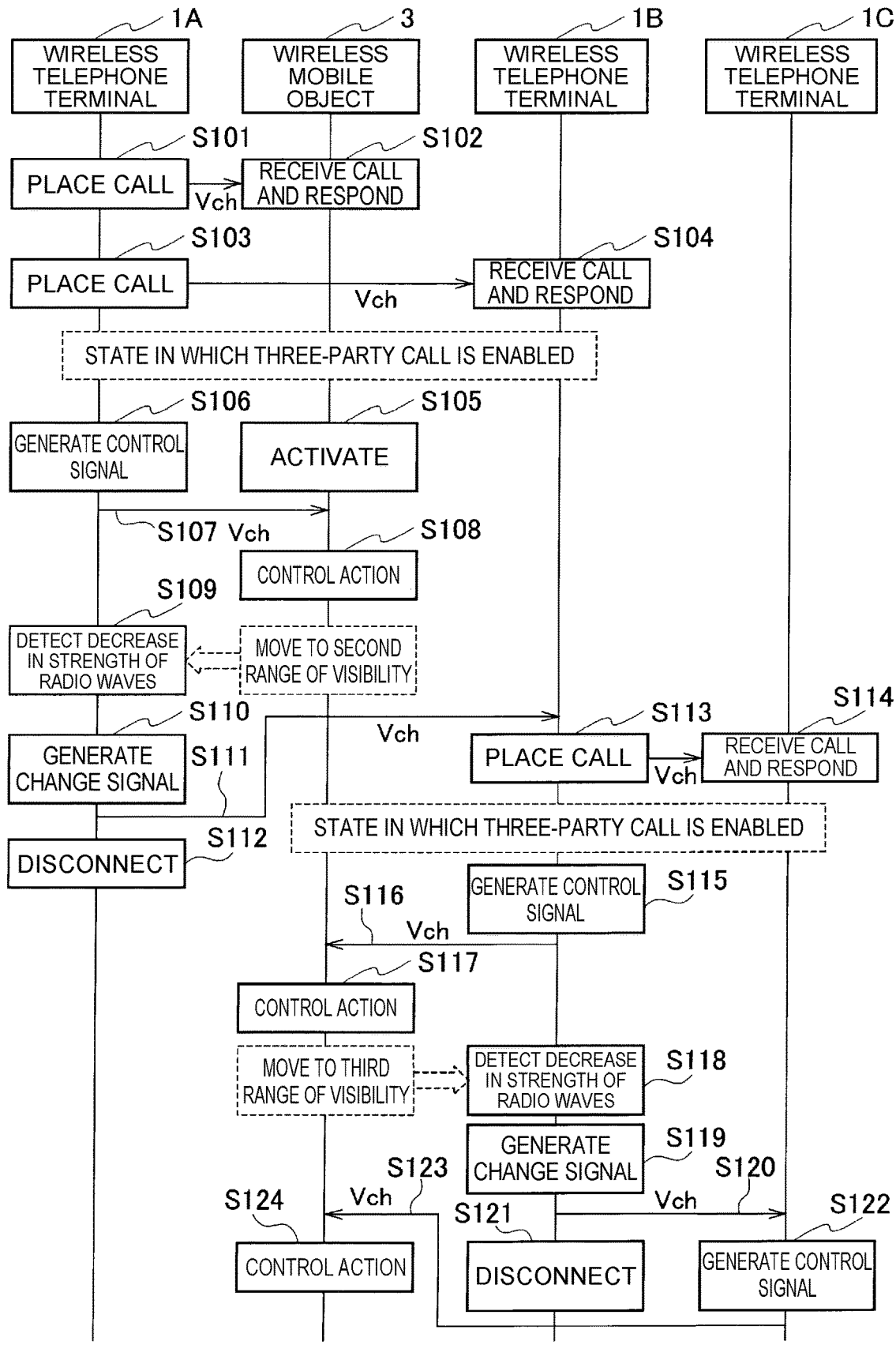
FIG. 5 is a sequence showing an example of operation in the control system in the first embodiment of the present invention.
Figure 6:
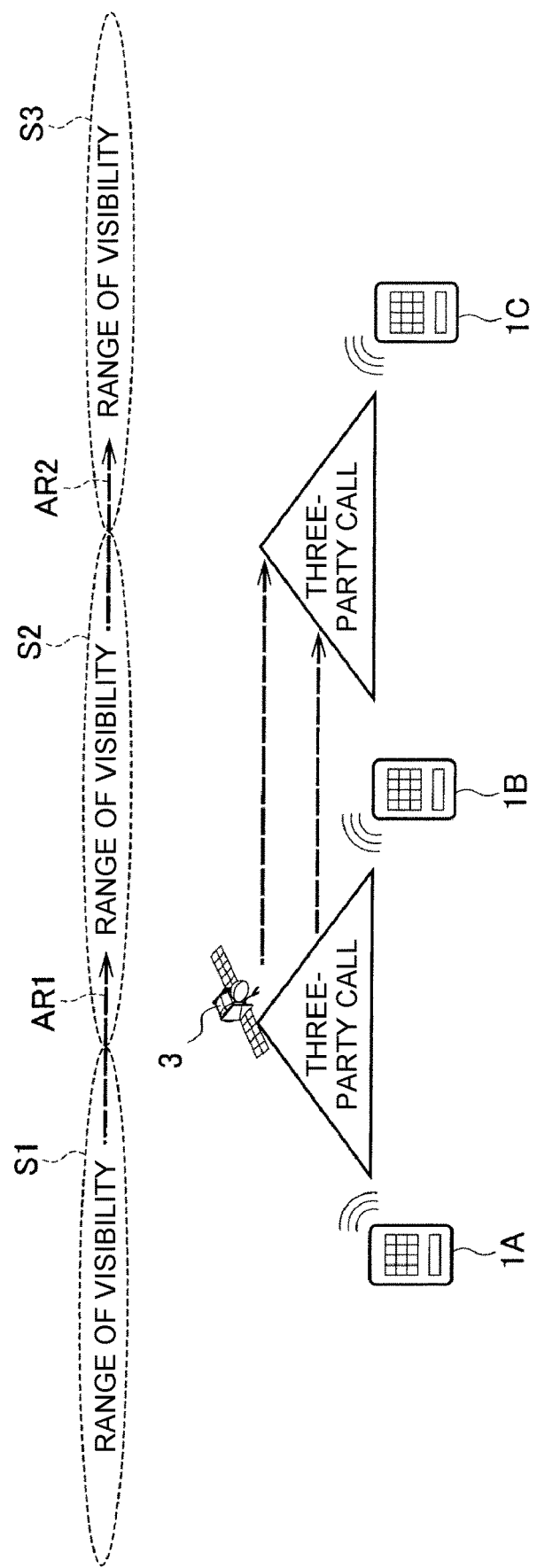
FIG. 6 is a reference diagram showing an example of movement of the wireless mobile object in the first embodiment of the present invention.

FIG. 5 is a sequence showing an example of operation in the control system. FIG. 6 is a reference diagram showing an example of movement of the wireless mobile object 3. For example, a user moves the wireless mobile object 3 from Tokyo Station in a southward direction along the Yamanote Line. The wireless telephone terminal 1A is positioned near Tokyo Station. The wireless telephone terminal 1B is positioned near Yurakucho Station, which is a next station to Tokyo Station. The wireless telephone terminal 1C is positioned near Shimbashi Station, which is a station after the next one to Tokyo Station.

Step S101;
At the wireless telephone terminal 1A, the call placement/reception unit 13 outputs a calling signal for a call to the wireless mobile object 3 through a voice channel Vch over the mobile communication network NW, by using the three-party call function.

Step S102;
At the wireless mobile object 3, the call placement/reception unit 32 receives and responds to the calling signal from the wireless telephone terminal 1A through the voice channel Vch over the mobile communication network NW.

Step S103;
At the wireless telephone terminal 1A, the call placement/reception unit 13 outputs a calling signal for the call to the wireless telephone terminal 1B through a voice channel Vch over the mobile communication network NW, by using the three-party call function.

Step S104;
At the wireless telephone terminal 1B, the call placement/reception unit 13 receives and responds to the calling signal from the wireless telephone terminal 1A through the voice channel Vch over the mobile communication network NW.

Through steps S101 to S104, a state is brought about in which the three-party call is enabled among the wireless telephone terminal 1A, the wireless mobile object 3, and the wireless telephone terminal 1B through a voice channel Vch over the mobile communication network NW.

Step S105;
At the wireless mobile object 3, the control unit 36 activates the wireless mobile object 3. For example, in response to the call from the wireless telephone terminal 1, the control unit 36 brings about a standby state by starting an engine of the wireless mobile object 3.

Step S106;
At the wireless telephone terminal 1A, the control unit 17 receives maneuver information (for example, a data sequence created by combining any of a symbol, a number, and a character, or voice) for the wireless mobile object 3, and generates a control signal including the maneuver information (for example, a tone signal including the data sequence, a voice signal including the voice that is coded). For example, the input unit 15 receives a data sequence created by combining a symbol and a number inputted by the user of the wireless telephone terminal 1A using the touch panel button. The data sequence inputted is a combination of a symbol and a number corresponding to a maneuver of the wireless mobile object 3 that the user desires to carry out. For example, in order to cause the wireless mobile object 3 to "move forward" toward Yurakucho Station, the user inputs "*3 #". "3" corresponds to a forward movement maneuver. "*" is a control start key. "#" is a control end key. In addition, the input unit 15 may receive user voice such as "move forward".

Step S107;
At the wireless telephone terminal 1A, the control unit 17 transmits the generated control signal to the wireless mobile object 3 through the voice channel Vch over the mobile communication network NW.

Step S108;
At the wireless mobile object 3, the reception unit 33 receives the control signal from the wireless telephone terminal 1A over the mobile communication network NW, the translation unit 34 translates the received control signal into the maneuver information, and the control unit 36 controls an action of the wireless mobile object 3 based on the maneuver information obtained through translation. For example, the translation unit 34 translates the tone signal from the wireless telephone terminal 1 into the maneuver information by using the translation information read from the storage unit 35. Since the tone signal is "*3 #", the translation unit 34 translates the tone signal into the maneuver information of "forward movement", and the control unit 36 increases rotational speed of propellers included in the wireless mobile object 3.

After step S101 is started, the wireless telephone terminal 1A constantly receives radio waves outputted from the wireless mobile object 3. The measurement unit 18 measures strength of the radio waves at any appropriate time. Currently, the wireless mobile object 3 is moving from a range of visibility S1 around Tokyo Station to a range of visibility S2 around Yurakucho Station, as indicated by an arrow AR1 in FIG. 6.

Step S109;

At the wireless telephone terminal 1A, the determination unit 19 determines whether or not the strength of the radio waves outputted from the wireless mobile object 3 is less than the threshold value. When the strength of the radio waves decreases to less than the threshold value, the determination unit 19 notifies the control unit 17 that the strength of the radio waves from the wireless mobile object 3 decreases to less than the threshold value.

Step S110;

At the wireless telephone terminal 1A, in order to hand power to maneuver the wireless mobile object 3 over to the wireless telephone terminal 1B, the control unit 17 generates a change signal for changing a user who maneuvers the wireless mobile object 3.

Step S111;

At the wireless telephone terminal 1A, the control unit 17 transmits the generated change signal to the wireless telephone terminal 1B through the voice channel Vch over the mobile communication network NW.

Step S112;

At the wireless telephone terminal 1A, the call placement/reception unit 13 disconnects the call.

Step S113;

At the wireless telephone terminal 1B, the call placement/reception unit 13, triggered by the change signal, outputs a calling signal for the call to the wireless telephone terminal 1C through a voice channel Vch over the mobile communication network NW, by using the three-party call function.

Step S114;

At the wireless telephone terminal 1C, the call placement/reception unit 13 receives and responds to the calling signal from the wireless telephone terminal 1B through the voice channel Vch over the mobile communication network NW.

At such a timing, a state is brought about in which the three-party call is enabled among the wireless telephone terminal 1B, the wireless mobile object 3, and the wireless telephone terminal 1C through a voice channel Vch over the mobile communication network NW.

Step S115;

At the wireless telephone terminal 1B, the control unit 17, triggered by the change signal, receives maneuver information for the wireless mobile object 3 and generates a control signal including the maneuver information. For example, in order to cause the wireless mobile object 3 to "move forward" toward Shimbashi Station, a user inputs "*3 #".

Step S116;

At the wireless telephone terminal 1B, the control unit 17 transmits the generated control signal to the wireless mobile object 3 through the voice channel Vch over the mobile communication network NW.

Step S117;

At the wireless mobile object 3, the reception unit 33 receives the control signal from the wireless telephone terminal 1B over the mobile communication network NW, the translation unit 34 translates the received control signal into the maneuver information, and the control unit 36 controls an action of the wireless mobile object 3 based on the maneuver information obtained through translation.

After the wireless telephone terminal 1B responds in Step S104, the wireless telephone terminal 1B constantly receives radio waves outputted from the wireless mobile object 3. The measurement unit 18 measures strength of the radio waves at any appropriate time. Currently, the wireless mobile object 3 is moving from the range of visibility S2 around Yurakucho Station to a range of visibility S3 around Shimbashi Station, as indicated by an arrow AR2 in FIG. 6.

Step S118;

At the wireless telephone terminal 1B, the determination unit 19 determines whether or not the strength of the radio waves outputted from the wireless mobile object 3 is less than the threshold value. When the strength of the radio waves decreases to less than the threshold value, the determination unit 19 notifies the control unit 17 that the strength of the radio waves from the wireless mobile object 3 decreases to less than the threshold value.

Step S119;

At the wireless telephone terminal 1B, in order to hand power to maneuver the wireless mobile object 3 over to the wireless telephone terminal 1C, the control unit 17 generates a change signal for changing a user who maneuvers the wireless mobile object 3.

Step S120;

At the wireless telephone terminal 1B, the control unit 17 transmits the generated change signal to the wireless telephone terminal 1C through the voice channel Vch over the mobile communication network NW.

Step S121;

At the wireless telephone terminal 1B, the call placement/reception unit 13 disconnects the call.

Step S122;

At the wireless telephone terminal 1C, the control unit 17, triggered by the change signal, receives maneuver information for the wireless mobile object 3 and generates a control signal including the maneuver information. For example, in order to cause the wireless mobile object 3 to "move forward" to a destination in a vicinity of Shimbashi Station and "land" there, a user inputs "*3 #", and inputs "*0 #" when the wireless mobile object 3 comes above the destination. "0" corresponds to a stay maneuver.

Step S123;

At the wireless telephone terminal 1C, the control unit 17 transmits the generated control signals to the wireless mobile object 3 through the voice channel Vch over the mobile communication network NW.

Step S124;

At the wireless mobile object 3, the reception unit 33 receives the control signals from the wireless telephone terminal 1C over the mobile communication network NW, the translation unit 34 translates the received control signals into the maneuver information, and the control unit 36 controls actions of the wireless mobile object 3 based on the maneuver information obtained through translation.

Here, attention is directed to the actions of the wireless mobile object 3. First, action control for forward movement is performed by the wireless telephone terminal 1A. When the strength of the radio waves to the wireless telephone terminal 1A decreases, action control is handed over to the wireless telephone terminal 1B, and action control for further forward movement is performed, in turn, by the wireless telephone terminal 1B. Thereafter, when the strength of the radio waves to the wireless telephone terminal 1B decreases, action control is further handed over to the wireless telephone terminal 1C. As described above, since a plurality of wireless telephone terminals 1 deployed at mutually different places and the wireless mobile object 3 are always in a call-enabled state by using the three-party call function, it is possible to seamlessly operate the wireless mobile object 3.

Second Embodiment

In a second embodiment, the telephone conferencing function of a telephone conferencing system is used as an example of the multi-point call function.
(Entire Configuration of Control System)

Figure 7:
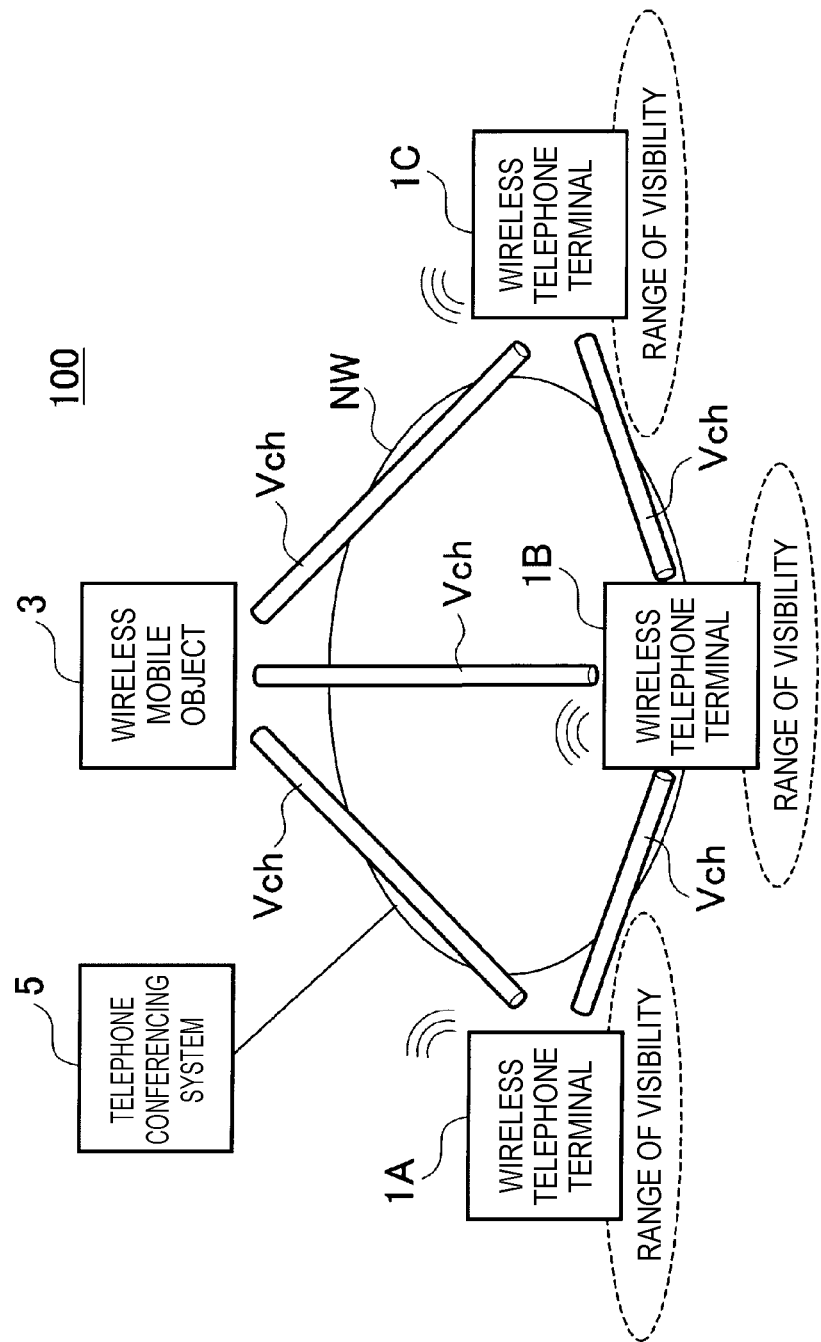
FIG. 7 is a configuration diagram showing an entirety of a control system in a second embodiment of the present invention.

FIG. 7 is a configuration diagram showing an entirety of a control system 100 in the second embodiment of the present invention. The control system 100 in the second embodiment, in addition to the components of the control system 100 in the first embodiment, further includes a telephone conferencing system 5 communicably connected to the mobile communication network NW.

The telephone conferencing system 5 is a system that provides the telephone conferencing function. The telephone conferencing system 5 is assigned a dedicated telephone number (access point). By placing a call to the access point, a state is brought about in which an all-party call is enabled among a plurality of wireless telephone terminals 1 and a wireless mobile object 3.
(Configurations of Wireless Telephone Terminal and Wireless Mobile Object)

Each wireless telephone terminal 1 (1A to 1C) includes the same configuration as the configuration described in the first embodiment. Each wireless telephone terminal 1 (1A to 1C) transmits a calling signal to the wireless mobile object 3 or another wireless telephone terminal 1 in the first embodiment, but transmits a calling signal to the telephone conferencing system 5 in the second embodiment. The wireless mobile object 3 also includes the same configuration as the configuration described in the first embodiment. In the second embodiment, the wireless mobile object 3 transmits a calling signal to the telephone conferencing system 5.
(Operation in Control System)

Figure 8:
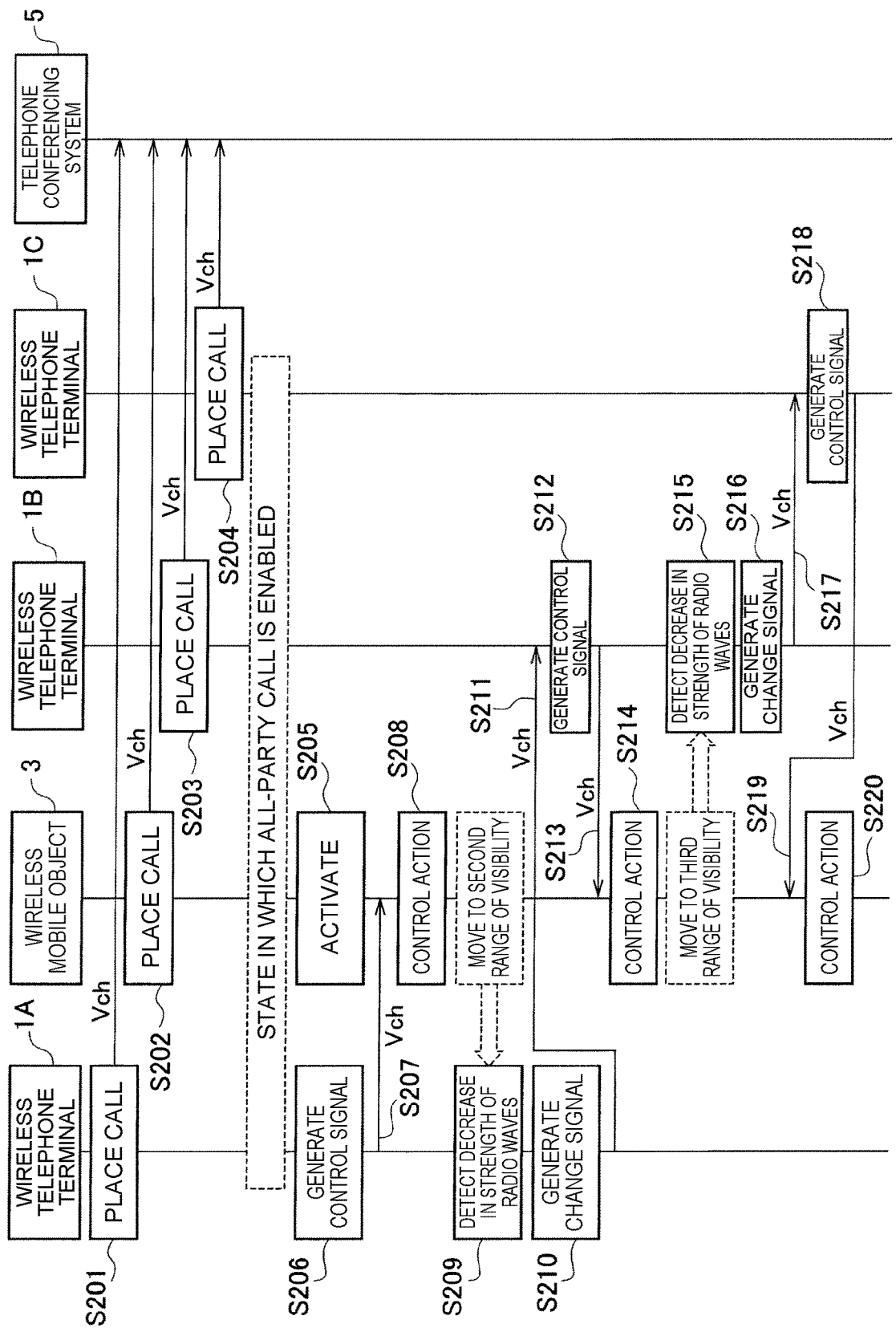
FIG. 8 is a sequence showing an example of operation in the control system in the second embodiment of the present invention.
Figure 9:
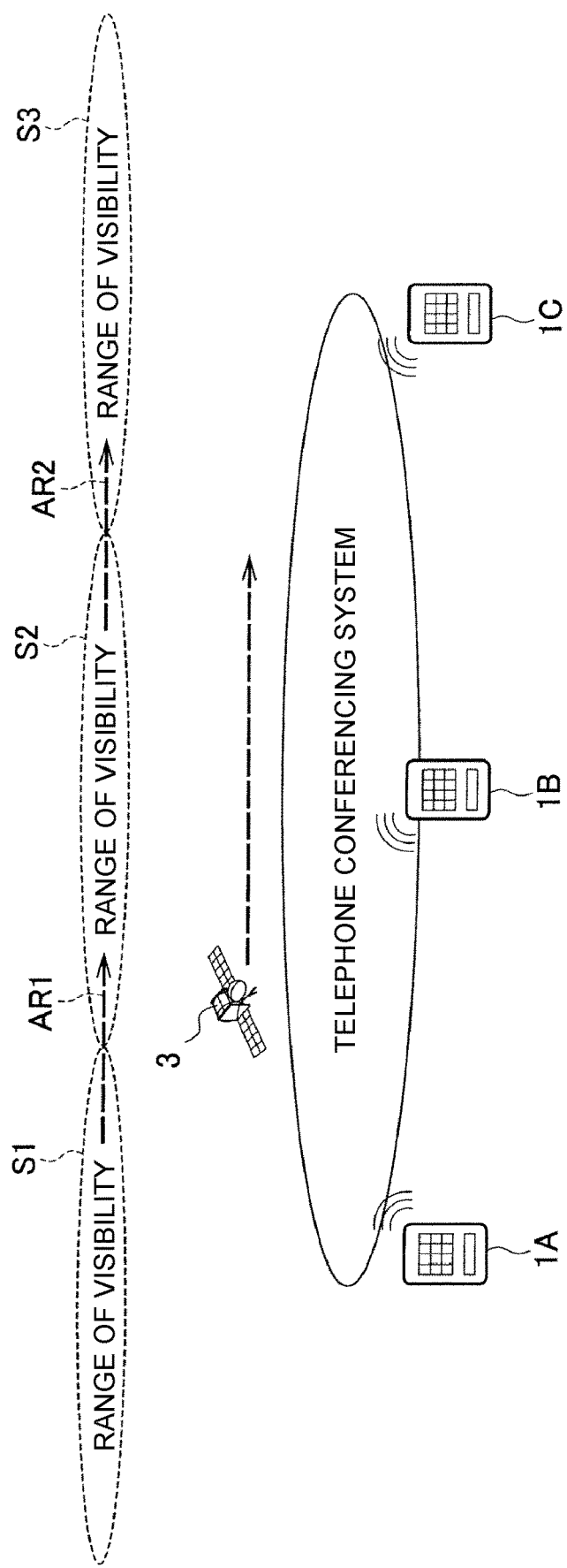
FIG. 9 is a reference diagram showing an example of movement of the wireless mobile object in the second embodiment of the present invention.

FIG. 8 is a sequence showing an example of operation in the control system. FIG. 9 is a reference diagram showing an example of movement of the wireless mobile object 3. As in the first embodiment, a user moves the wireless mobile object 3 from Tokyo Station in a southward direction along the Yamanote Line.

Step S201;
At the wireless telephone terminal 1A, the call placement/reception unit 13 outputs a calling signal for a call to the telephone conferencing system 5 through a voice channel Vch over the mobile communication network NW.

Step S202;
At the wireless mobile object 3, the call placement/reception unit 32 outputs a calling signal for the call to the telephone conferencing system 5 through a voice channel Vch over the mobile communication network NW.

Step S203;
At the wireless telephone terminal 1B, the call placement/reception unit 13 outputs a calling signal for the call to the telephone conferencing system 5 through a voice channel Vch over the mobile communication network NW.

Step S204;
At the wireless telephone terminal 1C, the call placement/reception unit 13 outputs a calling signal for the call to the telephone conferencing system 5 through a voice channel Vch over the mobile communication network NW.

Through steps S201 to S204, a state is brought about in which the all-party call is enabled among the wireless telephone terminal 1A, the wireless mobile object 3, the wireless telephone terminal 1B, and the wireless telephone terminal 1C through a voice channel Vch over the mobile communication network NW.

Step S205;
At the wireless mobile object 3, the control unit 36 activates the wireless mobile object 3. For example, the control unit 36 brings about a standby state by starting an engine of the wireless mobile object 3.

Step S206;
At the wireless telephone terminal 1A, the control unit 17 receives maneuver information for the wireless mobile object 3, and generates a control signal including the maneuver information. For example, in order to cause the wireless mobile object 3 to "move forward" toward Yurakucho Station, the user inputs "*3 #".

Step S207;
At the wireless telephone terminal 1A, the control unit 17 transmits the generated control signal to the wireless mobile object 3 through the voice channel Vch over the mobile communication network NW.

Step S208;
At the wireless mobile object 3, the reception unit 33 receives the control signal from the wireless telephone terminal 1A over the mobile communication network NW, the translation unit 34 translates the received control signal into the maneuver information, and the control unit 36 controls an action of the wireless mobile object 3 based on the maneuver information obtained through translation. Since the tone signal is "*3 #", the translation unit 34 translates the tone signal into the maneuver information of "forward movement". The control unit 36 increases rotational speed of propellers included in the wireless mobile object 3.

After Step S201 is started, the wireless telephone terminal 1A constantly receives radio waves outputted from the wireless mobile object 3. The measurement unit 18 measures strength of the radio waves at any appropriate time. Currently, the wireless mobile object 3 is moving from a range of visibility S1 around Tokyo Station to a range of visibility S2 around Yurakucho Station, as indicated by an arrow AR1 in FIG. 9.

Step S209;
At the wireless telephone terminal 1A, the determination unit 19 determines whether or not the strength of the radio waves outputted from the wireless mobile object 3 is less than the threshold value. When the strength of the radio waves decreases to less than the threshold value, the determination unit 19 notifies the control unit 17 that the strength of the radio waves from the wireless mobile object 3 decreases to less than the threshold value.

Step S210;
At the wireless telephone terminal 1A, in order to hand power to maneuver the wireless mobile object 3 over to the wireless telephone terminal 1B, the control unit 17 generates a change signal for changing a user who maneuvers the wireless mobile object 3.

Step S211;
At the wireless telephone terminal 1A, the control unit 17 transmits the generated change signal to the wireless telephone terminal 1B through the voice channel Vch over the mobile communication network NW.

Step S212;
At the wireless telephone terminal 1B, the control unit 17, triggered by the change signal, receives maneuver information for the wireless mobile object 3 and generates a control signal including the maneuver information. For example, in order to cause the wireless mobile object 3 to "move forward" toward Shimbashi Station, a user inputs "*3 #".

Step S213;

At the wireless telephone terminal 1B, the control unit 17 transmits the generated control signal to the wireless mobile object 3 through the voice channel Vch over the mobile communication network NW.

Step S214;

At the wireless mobile object 3, the reception unit 33 receives the control signal from the wireless telephone terminal 1B over the mobile communication network NW, the translation unit 34 translates the received control signal into the maneuver information, and the control unit 36 controls an action of the wireless mobile object 3 based on the maneuver information obtained through translation.

After Step S203 is started, the wireless telephone terminal 1B constantly receives radio waves outputted from the wireless mobile object 3. The measurement unit 18 measures strength of the radio waves at any appropriate time. Currently, the wireless mobile object 3 is moving from the range of visibility S2 around Yurakucho Station to a range of visibility S3 around Shimbashi Station, as indicated by an arrow AR2 in FIG. 9.

Step S215;

At the wireless telephone terminal 1B, the determination unit 19 determines whether or not the strength of the radio waves outputted from the wireless mobile object 3 is less than the threshold value. When the strength of the radio waves decreases to less than the threshold value, the determination unit 19 notifies the control unit 17 that the strength of the radio waves from the wireless mobile object 3 decreases to less than the threshold value.

Step S216;

At the wireless telephone terminal 1B, in order to hand power to maneuver the wireless mobile object 3 over to the wireless telephone terminal 1C, the control unit 17 generate a change signal for changing a user who maneuvers the wireless mobile object 3.

Step S217;

At the wireless telephone terminal 1B, the control unit 17 transmits the generated change signal to the wireless telephone terminal 1C through the voice channel Vch over the mobile communication network NW.

Step S218;

At the wireless telephone terminal 1C, the control unit 17, triggered by the change signal, receives maneuver information for the wireless mobile object 3 and generates a control signal including the maneuver information. For example, in order to cause the wireless mobile object 3 to "move forward" to a destination in a vicinity of Shimbashi Station and "land" there, a user inputs "*3 #", and inputs "*0 #" when the wireless mobile object 3 comes above the destination.

Step S219;

At the wireless telephone terminal 1C, the control unit 17 transmits the generated control signals to the wireless mobile object 3 through the voice channel Vch over the mobile communication network NW.

Step S220;

At the wireless mobile object 3, the reception unit 33 receives the control signals from the wireless telephone terminal 1C over the mobile communication network NW, the translation unit 34 translates the received control signals into the maneuver information, and the control unit 36 controls actions of the wireless mobile object 3 based on the maneuver information obtained through translation.

Here, attention is directed to the actions of the wireless mobile object 3. First, action control for forward movement is performed by the wireless telephone terminal 1A. When the strength of the radio waves to the wireless telephone terminal 1A decreases, action control is handed over to the wireless telephone terminal 1B, and action control for further forward movement is performed, in turn, by the wireless telephone terminal 1B. Thereafter, when the strength of the radio waves to the wireless telephone terminal 1B decreases, action control is further handed over to the wireless telephone terminal 1C. As described above, since the plurality of wireless telephone terminals 1 deployed at mutually different places and the wireless mobile object 3 are always in a call-enabled state by using the telephone conferencing function of the telephone conferencing system, it is possible to seamlessly operate the wireless mobile object 3.

Effects

According to the first embodiment and the second embodiment, the plurality of wireless telephone terminals 1A to 1C deployed at mutually different places and the wireless mobile object 3 establish a voice channel Vch over the mobile communication network NW through which a plurality of parties can simultaneously talk, by using a multi-point call function (for example, the three-party call function, the telephone conferencing function of a telephone conferencing system, or the like), and the wireless telephone terminal 1A controls the wireless mobile object 3 by transmitting a control signal to the wireless mobile object 3 through the voice channel Vch over the mobile communication network NW, and, when strength of radio waves from the wireless mobile object 3 decreases to less than the threshold value, transmits a change signal for changing a user who maneuvers the wireless mobile object 3, to the wireless telephone terminal 1B through the voice channel Vch over the mobile communication network NW, so that such operations are further repeatedly performed among the plurality of wireless telephone terminals 1A to 1C. Accordingly, according to the first embodiment and the second embodiment, disconnection from and reconnection to the wireless mobile object 3 are not required even when the wireless mobile object 3 moves beyond a range of visibility, and it is possible to seamlessly operate the wireless mobile object 3.

Modification Examples of the First Embodiment and The Second Embodiment

In the first embodiment and the second embodiment, the case is described in which the number of wireless telephone terminals 1 is three. The number of wireless telephone terminals 1 may be four or more. By increasing the number of wireless telephone terminals 1, a movement distance of the wireless mobile object 3 can be further extended.

Application of the Present Invention

The present invention can be applied to, for example, transportation of a package by an unmanned aerial vehicle, shooting an aerial video or filming or broadcasting a tracked vehicle by mounting a camera on an unmanned aerial vehicle, and the like.

Matters Common in the Embodiments

Figure 10:
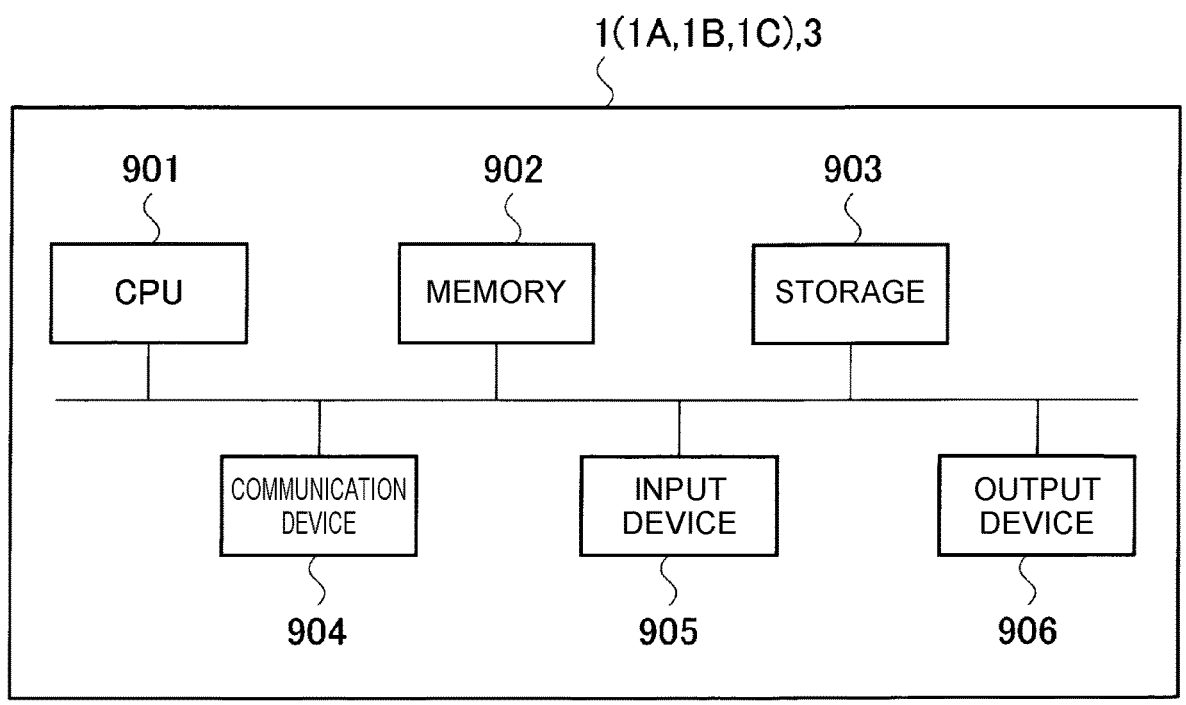
FIG. 10 is a hardware configuration diagram of a computer.

The present invention is not limited to the embodiments described above, and various changes can be made within the scope of the substances of the embodiments. For the wireless telephone terminals 1 (1A to 1C) and the wireless mobile object 3 in the embodiments, for example, a general-purpose computer system can be used that includes a CPU (Central Processing Unit, processor) 901, a memory 902, a storage (Hard Disk Drive, Solid State Drive) 903, a communication device 904, an input device 905, and an output device 906 as shown in FIG. 10. The memory 902 and the storage 903 are storage devices. In the computer system, the CPU 901 executes a predetermined program loaded on the memory 902, whereby each function of the wireless telephone terminals (1A to 1C) and the wireless mobile object 3 is implemented.

Each of the wireless telephone terminals 1 (1A to 1C) and the wireless mobile object 3 may be implemented by using a single computer, or may be implemented by using a plurality of computers. Each of the wireless telephone terminals 1 (1A to 1C) and the wireless mobile object 3 may be a virtual machine implemented on a computer.

A program for each of the wireless telephone terminals 1 (1A to 1C) and the wireless mobile object 3 can be stored in a computer-readable recording medium, such as HDD, SSD, USB (Universal Serial Bus) memory, CD (Compact Disc), or DVD (Digital Versatile Disc), or can be delivered over a network.

REFERENCE SIGNS LIST

1 (1A to 1C): Wireless telephone terminal
11: First communication unit
12: Second communication unit
13: Call placement/reception unit
14: Storage unit
15: Input unit
16: Display unit
17: Control unit
18: Measurement unit
19: Determination unit
3: Wireless mobile object
31: First communication unit
32: Call placement/reception unit
33: Reception unit
34: Translation unit
35: Storage unit
36: Control unit
37: Second communication unit
5: Telephone conferencing system
901: CPU
902: Memory
903: Storage
904: Communication device
905: Input device
906: Output device
NW: Mobile communication network
Vch: Voice channel

The invention claimed is:

1. A control system comprising:
a first wireless telephone terminal;
a second wireless telephone terminal; and
a wireless mobile object,
wherein the first wireless telephone terminal includes:
a call placement/reception unit, implemented using one or more computing devices, that establishes a voice channel over a mobile communication network with the second wireless telephone terminal and the wireless mobile object by using a multi-point call function of controlling a voice call among a plurality of points, and
a control unit, implemented using one or more computing devices, that controls the wireless mobile object by transmitting a control signal to the wireless mobile object through the voice channel, and that transmits, to the second wireless telephone terminal through the voice channel, a change signal for changing a user who maneuvers the wireless mobile object based on strength of radio waves from the wireless mobile object being decreased to less than a threshold value,
wherein the second wireless telephone terminal includes:
a call placement/reception unit, implemented using one or more computing devices, that establishes the voice channel over the mobile communication network with the first wireless telephone terminal and the wireless mobile object by using the multi-point call function, and
a control unit, implemented using one or more computing devices, that controls the wireless mobile object by transmitting a control signal to the wireless mobile object through the voice channel based on the change signal being received from the first wireless telephone terminal, and
wherein the wireless mobile object includes:
a call placement/reception unit, implemented using one or more computing devices, that establishes the voice channel over the mobile communication network with the first wireless telephone terminal and the second wireless telephone terminal by using the multi-point call function, and
a control unit, implemented using one or more computing devices, that controls an action of the wireless mobile object, based on (i) the control signal received from the first wireless telephone terminal through the voice channel or (ii) the control signal received from the second wireless telephone terminal through the voice channel.

2. The control system according to claim 1, wherein the control signal is at least one of (i) a tone signal including a data sequence of a symbol and a number or (ii) a voice signal including voice.

3. A wireless telephone terminal comprising:
a call placement/reception unit, implemented using one or more computing devices, that establishes a voice channel over a mobile communication network with another wireless telephone terminal and a wireless mobile object by using a multi-point call function of controlling a voice call among a plurality of points; and
a control unit, implemented using one or more computing devices, that controls the wireless mobile object by transmitting a control signal to the wireless mobile object through the voice channel, and that transmits, to the another wireless telephone terminal through the voice channel, a change signal for changing a user who maneuvers the wireless mobile object based on strength of radio waves from the wireless mobile object being decreased to less than a threshold value.

4. The wireless telephone terminal according to claim 3, wherein the control unit is configured to, based on a change signal for changing a user who maneuvers the wireless mobile object being received, control the wireless mobile object by transmitting a control signal to the wireless mobile object through the voice channel.

5. A control method for controlling a wireless mobile object, performed by a wireless telephone terminal, comprising:
- establishing a voice channel over a mobile communication network with another wireless telephone terminal and the wireless mobile object by using a multi-point call function of controlling a voice call among a plurality of points;
- controlling the wireless mobile object by transmitting a control signal to the wireless mobile object through the voice channel; and
- transmitting, to the another wireless telephone terminal through the voice channel, a change signal for changing a user who maneuvers the wireless mobile object based on strength of radio waves from the wireless mobile object being decreased to less than a threshold value.

6. The control method according to claim 5, further comprising:
- based on a change signal for changing a user who maneuvers the wireless mobile object being received, controlling the wireless mobile object by transmitting a control signal to the wireless mobile object through the voice channel.

* * * * *